United States Patent [19]
Kuzma

[11] Patent Number: 5,771,355
[45] Date of Patent: Jun. 23, 1998

[54] TRANSMITTING ELECTRONIC MAIL BY EITHER REFERENCE OR VALUE AT FILE-REPLICATION POINTS TO MINIMIZE COSTS

[75] Inventor: Andrew J. Kuzma, Portland, Oreg.

[73] Assignee: Intel Corporation, Santa Clara, Calif.

[21] Appl. No.: 576,006

[22] Filed: Dec. 21, 1995

[51] Int. Cl.⁶ .................................................. G06F 15/163
[52] U.S. Cl. .............................. 395/200.62; 395/200.56; 395/200.75; 707/501; 707/513; 705/7
[58] Field of Search ..................................... 395/602, 621, 395/762, 200.09, 200.13, 200.56, 200.62, 200.75; 707/501, 513; 705/7

[56] References Cited

U.S. PATENT DOCUMENTS

5,355,472  10/1994  Lewis ....................................... 707/101
5,418,908   5/1995  Keller et al. ....................... 395/200.36
5,446,891   8/1995  Kaplan et al. ............................. 707/2
5,572,643  11/1996  Judson ................................ 395/200.48
5,613,108   3/1997  Morikawa ................................ 707/200
5,619,648   4/1997  Canale et al. ...................... 395/200.36
5,634,062   5/1997  Shimizu et al. ......................... 707/501

Primary Examiner—Kenneth S. Kim
Attorney, Agent, or Firm—Duane, Morris & Heckscher LLP

[57] ABSTRACT

Transmitting e-mail over a network. According to a preferred embodiment, a current node in the network receives an e-mail message to be distributed to at least one recipient. The e-mail message comprises an attachment reference comprising the network address of an attachment stored locally to a previous node of the network. The costs of forwarding the e-mail message given a previous network location of the attachment is compared to the costs of moving the attachment locally to the current node. A copy of the attachment is retrieved, stored locally to the current node, and the attachment reference is updated, in accordance with the comparison.

44 Claims, 6 Drawing Sheets

TRANSMITTING ELECTRONIC MAIL BY EITHER REFERENCE OR VALUE AT FILE-REPLICATION POINTS TO MINIMIZE COSTS

BACKGROUND OF THE INVENTION

1. Field of the Invention

The present invention relates to the transmission of electronic mail over computer networks, and, in particular, to apparatuses and method for providing for electronic mail attachments by reference rather than by value.

2. Description of the Related Art

In computer network systems such as local-area networks ("LANs"), wide-area networks ("WANs"), and the Internet and the world-wide web ("WWW") which operates thereon, electronic mail ("e-mail") systems are often utilized to facilitate communication between two users of the network. Each user has a unique network address which may be used for routing and identifying purposes in delivering an e-mail message from one user (the "sender") to another user (the "recipient") on the network.

Often an e-mail message contains a relatively small amount of text or other forms of data. One or more additional files of data, called "attachments," are often attached to the e-mail message. For example, a word processing file or graphic file that is incompatible with the display capabilities of the e-mail system or that is too large to be conveniently displayed by the e-mail application program may be transmitted from the sender to the recipient by attaching it to an e-mail message. The e-mail message may introduce or explain the attachments attached thereto, for example. Thus, the recipient receives the e-mail message plus any attached data files, which may be opened, accessed, or utilized separately from the e-mail message itself.

Such attachments are typically transmitted via the transmission medium of the network "by value," which means that the actual data of a given attachment is transmitted along with the primary e-mail message (or an attachment may be transmitted independently, with no accompanying e-mail message). One problem with current methods of transmitting e-mail attachments is that, because of the potentially significant size of such attachments, a large amount of network communications bandwidth can be consumed in order to transmit such attachments. Costly network resources may also be required as such message and attachments traverse several nodes or elements of the network on the way from the sender to the recipient node. Additionally, the memory storage devices of local nodes of the network that often store such incoming e-mail messages and their associated attached files may be overloaded by many incoming e-mail messages.

SUMMARY

There is provided herein a method, apparatus, and storage medium for transmitting e-mail over a network. According to a preferred embodiment of the invention, a current node in the network receives an e-mail message to be distributed to at least one recipient. The e-mail message comprises an attachment reference comprising the network address of an attachment stored locally to a previous node of the network. The costs of forwarding the e-mail message given a previous network location of the attachment is compared to the costs of moving the attachment locally to the current node. A copy of the attachment is retrieved, stored locally to the current node, and the attachment reference is updated, in accordance with the comparison.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
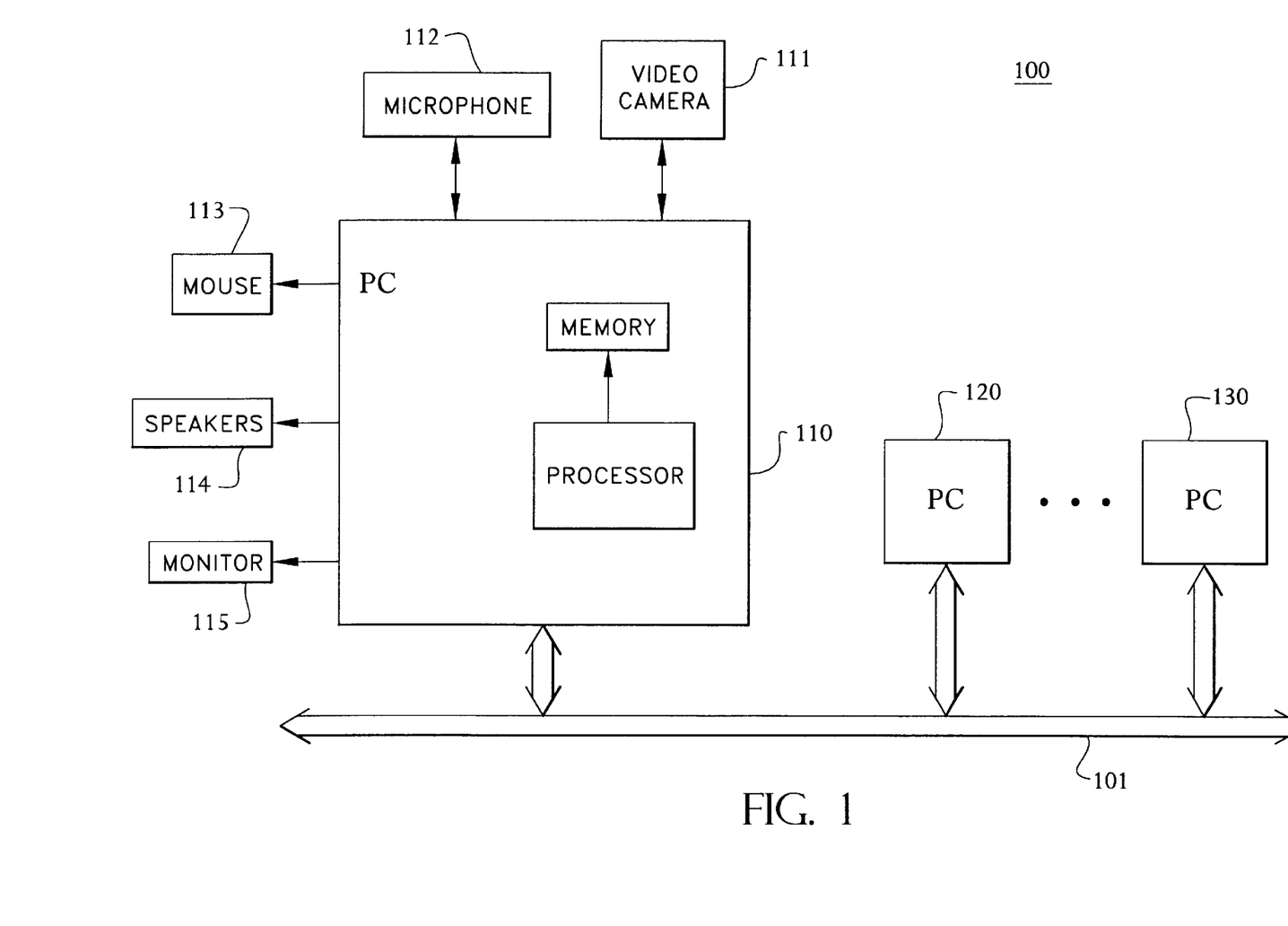
FIG. 1 shows a networked computer system in accordance with a preferred embodiment of the present invention.

Referring now to FIG. 1, there is shown networked computer system 100, in accordance with a preferred embodiment of the present invention. Networked computer system 100 comprises a plurality of nodes or personal computers ("PCs") 110, 120, 130. Personal computer or node 110 comprises a processor 116, memory 117, video camera 111, microphone 112, mouse 113, speakers 114, and monitor 115. Nodes 110, 120, 130 and other nodes of the network are interconnected via medium 101. Medium 101 may be, for example, a communication channel such as an Integrated Services Digital Network ("ISDN"). As will be understood, various nodes of a networked computer system may be connected through a variety of communication media, including local area networks ("LANs"), plain-old telephone lines ("POTS"), sometimes referred to as public switched telephone networks ("PSTN"), and the like. Various nodes of a network may also constitute computer system users interconnected via a network such as the Internet. As will be appreciated, each user of a network has a unique address or identification within the network. As used herein, "user" may be utilized interchangeably with a node of a network. Thus, each user or node has a particular network address within a given network that uniquely identifies the user or node. Those skilled in the art will understand, however, that this usage is to be distinguished from an actual human user who may also have a unique address, such as an e-mail address, that is not related to the network address of any particular node of the network, since human users can often access e-mail messages from arbitrary nodes within the network. However a human user at a given point in time while using a network uses a particular node having a unique network address as discussed above.

Often a multi-point data conferencing system may be supported by such a network, as well as the capability of transmitting e-mail messages from one user to another. A plurality of multi-point conferencing units ("MCUs") may thus be utilized, as will be understood by those skilled in the art, to transmit data to and from various nodes or "endpoints" of the conferencing system. Nodes and/or MCUs may be interconnected via an ISDN link or through a local area network ("LAN"), in addition to various other communications media such as nodes connected through the internet. Those skilled in the art will appreciate that nodes of a conferencing system may, in general, be connected directly to the communications medium such as a LAN or through an MCU, and that a conferencing system may comprise other nodes or elements such as routers, servers, and the like.

Processor 116 is preferably a general-purpose programmable processor, such as an Intel® Pentium™ processor. Those skilled in the art will also appreciate that processors of nodes of networked computer system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110, as will also be understood. It will further be understood that a node may be implemented on any suitable computer system in addition to personal computer systems.

Figure 2:
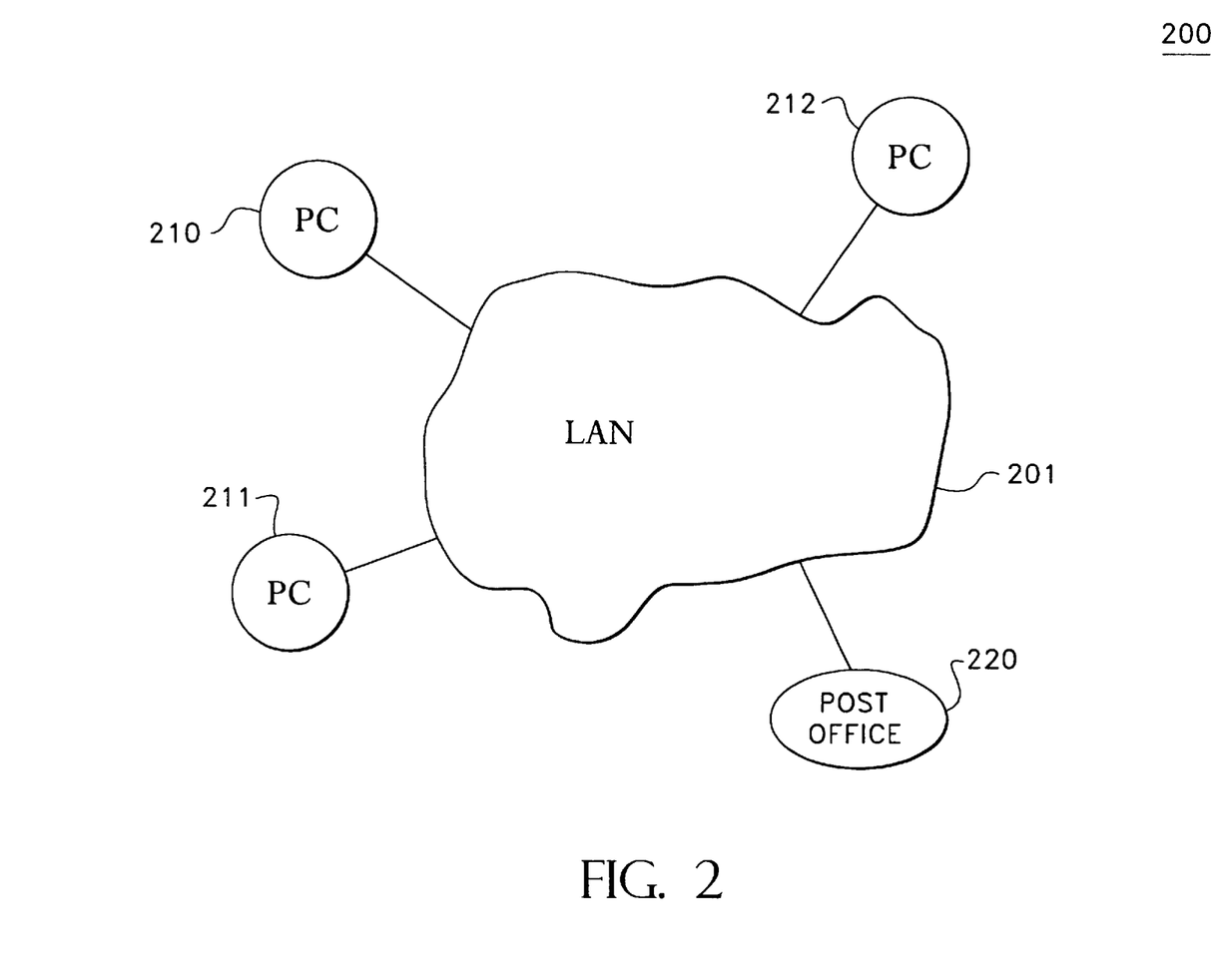
FIG. 2 depicts a second networked computer system in accordance with a preferred embodiment of the present invention.

Referring now to FIG. 2, there is shown a second networked computer system 200, in accordance with a preferred embodiment of the present invention. System 200 illustrates a network such as LAN 201, which may be used to interconnect a variety of users that may communicate with each other, for example with e-mail messages. Attached to LAN 201 are a plurality of users such as PCs 210, 211, 212. A user may also be connected to the LAN via a server or other means (not shown). As will be appreciated, system 200 comprises other types of nodes or elements, such as centralized post office server 220 and other routers, servers, and nodes. As will be appreciated, a post office server is a special type of server typically having a directory of the users or a subset of users on the LAN of which the post office server is attached, and serves as a repository of incoming mail for its users. As will be understood by those skilled in the art, in prior art e-mail techniques, a sending user such as PC 210 desiring to send and e-mail message with one or more attachments to a recipient such as PC 212 transmits the e-mail message plus attachment to LAN 220 for delivery to PC 212. The message and attachment are stored centrally at post office server 220, which then communicates to PC 212 through LAN 201 to inform the user of PC 201 that it has received e-mail. When the user of PC 212 selects an option running on a local version of an e-mail application program compatible with LAN 201, the e-mail message and any selected attachment are transmitted from centralized post office server 220 to PC 212 across LAN 201.

As explained hereinabove, this can lead to bandwidth problems. For example, post office 220 may need to store a very large number of e-mail messages and attachments as various users of the network send e-mail messages to one another. This can utilize substantial amounts of processing bandwidth of post office 220, and also requires communications bandwidth of LAN 201 to transmit such data to and from post office server 220. As will be appreciated, a plurality of LANs such as system 200, or other networks or users, may be further interconnected via other network links such as WAN links. For instance, post office 220 may send and receive messages to and from its own users such as PCs 210, 211, 212 to other particular users interfaced to another post officer server of another LAN (not shown). Such a linking of LANs through WAN or other links is illustrated in the exemplary system of FIG. 3.

Figure 3:
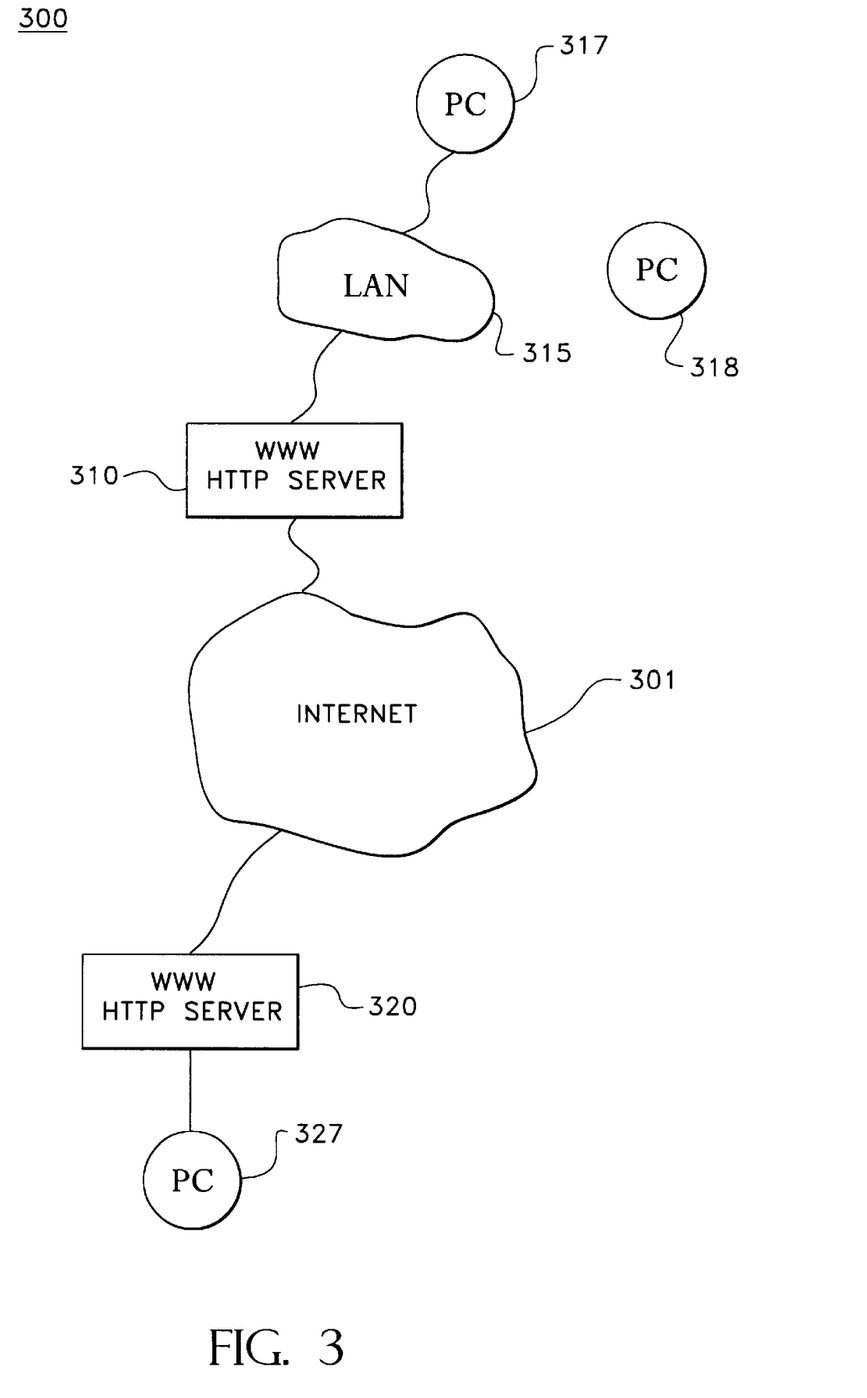
FIG. 3 illustrates a third networked computer system in accordance with a preferred embodiment of the present invention.

Referring now to FIG. 3, there is illustrated a third networked computer system 300, in accordance with a preferred embodiment of the present invention. System 300 illustrates a WWW system having communications across a backbone communications network such as Internet 301, which may be used to interconnect a variety of users that may communicate with each other, for example with e-mail messages. As will be appreciated, the WWW is a set of protocols operating on top of the Internet, and allows a graphical interface system to operate thereon for accessing information through the Internet. Attached to Internet 301 in the WWW are a plurality of users such as PCs 317, 318, 327. Typically, a user is interfaced to other nodes of the WWW through a WWW hyper text transport protocol ("HTTP") server such as servers 310, 320. As will be understood, the WWW is a distributed type of application, characterized by the WWW HTTP, the WWW's protocol, which runs on top of the Internet's transmission control protocol/Internet protocol ("TCP/IP"). As will also be understood, the WWW may thus be characterized by a set of protocols (i.e., HTTP) running on the Internet as its "backbone." A web browser is an application of a user of a network that, in WWW-compatible type network systems, allows users to view such information and thus allows the user to search graphical and text-based files that are linked together using "hypertext" links that are embedded in documents or files available from servers on the network that understand HTTP. As will be understood, when a given "web page" is retrieved by a user from another source across the Internet, the document retrieved may have various hypertext links embedded therein and a local copy of the page is created local to the user. Thus, when a user clicks on a hypertext link, the locally-stored information related to the selected hypertext link is typically sufficient to allow the user's machine to open a connection across the Internet to the server indicated by the hypertext link.

As will further be appreciated, more than one user may be coupled to each HTTP server, for example through a LAN such as LAN 315 as illustrated with respect to WWW HTTP server 310. As will further be appreciated, system 300 comprises other types of nodes or elements. As will be understood by those skilled in the art, in prior art e-mail techniques, a sending user of a network desiring to send an e-mail message with one or more attachments to a recipient on the network transmits the e-mail message plus attachment across the network (for example, a network such as Internet 301) through various links and nodes of the network until it reaches the recipient user.

As will be appreciated, a WWW HTTP server is an application running on a machine, such as a PC. Thus, each user may be considered to have a unique "server," as illustrated with respect to PC 327. Alternatively, a "server" may be considered to be a server such as WWW HTTP server 310 which provides access to the network for a LAN or plurality of nodes or plurality of LANs.

E-Mail Attachments by Reference

One problem with automatically attaching attachments by value is that many attachments are never read, viewed, or otherwise utilized by the recipient of the e-mail. Thus, the storage, processing bandwidth, and communications bandwidth resources utilized to transmit the attachment to the recipient are often used inefficiently. In networks such as networked computer system 200, this can lead to inefficient use of the storage and processing bandwidth of any centralized post office and of the communications bandwidth of the network. In networks such as computer system 300, again the interconnection network 301 may be utilized inefficiently as messages are transmitted that are never used by the recipient, needlessly consuming processing and communications resources. Therefore, in the e-mail system files are attached by reference instead of by value, as described in further detail hereinbelow.

Figure 4:
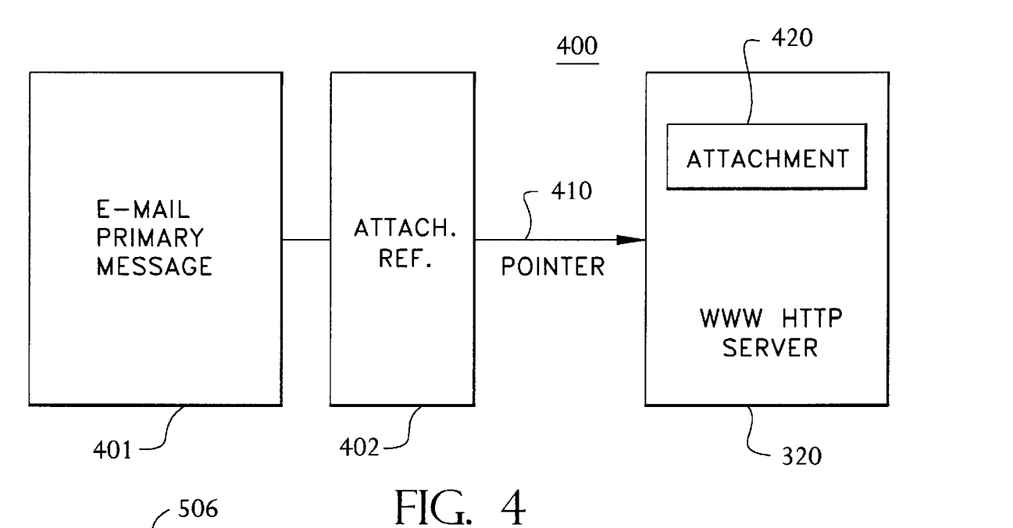
FIG. 4 illustrates an e-mail message format in accordance with a preferred embodiment of the present invention.

Referring now to FIG. 4, there is illustrated an e-mail message format 400 in accordance with a preferred embodiment of the present invention. In the e-mail message format 400 of the present invention, when a user such as PC 210 of FIG. 2 wishes to send an attachment with an e-mail message to a user such as PC 212, the e-mail message 401 is transmitted along with a relatively small attachment reference 402, instead of actually transmitting the entire attachment file along with e-mail message 401 as is done in prior art e-mail systems. Thus, instead of transmitting the attachment by value, the attachment is transmitted "by reference." As will be appreciated, attachment reference 402 comprises a pointer 410 that points to the actual location of the attachment 420. In a preferred embodiment, this location of the attachment 420 is typically a storage medium relatively local to the sending user so that fewer network resources are utilized in transmitting and storing the attachment, especially if a recipient does not actually require the attachment.

Thus, the attachment 402 is stored "locally" to the sending user, which means that the attachment need not be transmitted across as many network links and elements as would be needed to reach the recipient user. To store attachment 420 locally in a system using at least one centralized post office, such as system 200, the attachment is stored on PC 210 itself. PC 210 must thus be "visible" to LAN 201, so that a recipient such as PC 212 may retrieve attachment 420, when desired, from PC 210 via LAN 201 using attachment reference 402.

An attachment or e-mail may be distributed to multiple users as well. For example, e-mail message 401 is transmitted by PC 210 via LAN 201 to PC 212 and PC 211. As will be appreciated, e-mail message 401 may be temporarily stored in centralized post office server 220 before being further transmitted to PCs 211 and 212 via LAN 201. If the user of PC 210 also wishes to attach an attachment 420, then this attachment 420 and e-mail message 401 are created, but attachment 420 is not transmitted to either post office 220 or to PCs 211 or 212 via LAN 201. Rather, at this point attachment 420 is stored in PC 210 itself or in an associated or connected memory storage means, and attachment reference 402 is created to be transmitted as an attachment with e-mail primary message 401 to recipient PCs 211, 212. As will be appreciated, depending upon the configuration of the e-mail system applicable to LAN 201 and its user nodes, e-mail message 301 and its attachment reference 302 will be transmitted to recipient PCs 211 and 212 in the standard manner, e.g. either directly, across LAN 201, or through the intermediary node of post office 220.

If the user of any recipient PC 211 or 212 desires to access the attachment, the attachment reference 402 will enable the local recipient PC to retrieve the attachment 420 directly over LAN 201 from where it is stored in PC 210. In a preferred embodiment, this retrieval of attachment 420 does not need to go through post office 220.

To store attachment 420 locally in a system where users are interfaced to a network via local servers, such as in system 300, attachment 420 is stored in the local WWW HTTP server, as illustrated in FIG. 4. For instance, if PC 327 desires to transmit e-mail primary message 401 and attachment 420 to PC 317, then attachment 420 is stored in a file server of WWW HTTP server 320, which is "visible" to the WWW over the Internet 301, and attachment reference 402 is generated which comprises a uniform resource locator ("URL") pointer to the location of attachment 420 within WWW HTTP server 320. E-mail primary message 401 with attached attachment reference 402 are then transmitted recipient PC 317 across Internet 301 in the standard manner, and PC 317 may the use attachment reference 402 to access attachment 420 when desired.

In this manner, network bandwidth and resources are utilized more efficiently as there is no need to actually transmit the attachment 420 over the network unless a recipient of the corresponding e-mail message 401 is interested in viewing or otherwise using attachment 420.

In a preferred embodiment, attachment references are relatively small and approximately constant in size, for example on the order of 100 to 200 bytes. The actual attachment such as attachment 420 of e-mail format 400 is stored in a file storage means that is coupled to LAN 201 and that is visible to any server or user coupled to LAN 201, so that any recipient user's PC may retrieve attachment 420 if desired. Connecting to a node that is "visible" to the network is also sometimes referred to as opening a socket to the node. As will be understood by those skilled in the art, an attachment reference 402 comprises a file reference suitable for locating attachment 420. For example, with LAN 201 serving as a network under a WWW-compatible networking standard (for example, using the WWW's TCP/IP and WWW HTTP), attachment reference 402 comprises a WWW-type file reference, referred to as a uniform resource locator ("URL") that refers, or points, to the actual attachment file 420. As will be understood, attachment reference 402 is either a logical pointer or logical path that indicates either where the attachment, or a copy of it, resides. As will further be appreciated by those skilled in the art, a URL is a logical path used in the WWW HTTP. Attachment reference 420 may also comprise information that indicates what options were used to produce the stored attachment file 420, for example whether and/or how the attachment file 420 is compressed or encrypted.

As will also be appreciated, attachment 420 may be compressed (to minimize storage space and network bandwidth consumed) and/or encrypted (for privacy) before storing in WWW HTTP server 221 or before being transmitted from WWW HTTP server 221 to a recipient PC's respective WWW HTTP server. When e-mail message 401 and attachment reference 402 are received by a user of the network such as the user of PC 212, an application program running on PC 212 is able to retrieve attachment 420 using attachment reference 402. As will be understood, this retrieval may be made transparent to the user of PC 212. For instance, the user of PC 212 may be informed by PC 212 that a file 420 is "attached" to a recently-received e-mail message 401. If the user decides to view, launch, copy or otherwise utilize attachment 420, then PC 212 reads a copy of attachment 420 from WWW HTTP server 221, decompresses and decrypts attachment 420 as necessary, creates a local copy of attachment 420 just as if attachment 420 had originally been attached by value to e-mail message 401, and launches the appropriate application corresponding to the file type of attachment 420 (for example, a graphical viewer program may be launched to allow the viewing of attachment 420 if attachment 420 is a graphics file). As will be appreciated, in general a sender such as PC 210 must have access to some network server so that it is able to store the attachment file 420 in a directory on the network server, where the directory in which the attachment 420 is stored is visible to the network via the network server so that the attachment file 420 is accessible by recipient users of the network.

Alternatively, instead of the retrieval of attachment 420 being made transparent to the user of PC 212, the user may be given the option to view information about the remotely-stored attachment 420 before deciding to fetch this attachment. Additionally, as will be appreciated, an attachment may in alternative preferred embodiments be automatically deleted after being accessed by the recipient or by all of the recipients, where multiple recipients receive the e-mail message; or after a given time limit, such as 90 days. As will also be understood, one additional advantage of the present attachment by reference invention is that the locally-stored attachment may in some embodiments be updated if necessary, in some cases before a recipient has decided to read the attachment. Thus, although an attachment is distributed at a particular time before subsequent changes are made, at least some intended recipients may get a more up-to-date copy of the attachment when they finally decide to read the e-mail attachment.

Because the attachment file is stored on a WWW HTTP server or otherwise in a memory storage means local to the sending user but visible to other users of the network, it may be desirable to ensure that unauthorized WWW users browsing the WWW HTTP server are unable to obtain a usable copy of the attachment file. One method for accomplishing such security is to store attachment 420 in encrypted form The encryption key is transmitted with the original e-mail message 401 (e.g., stored within e-mail primary message 401, within attachment reference 402, or attached as a separate decryption key attachment to e-mail primary message 401 or to attachment reference 402). Thus, an unauthorized user is unable to decipher the actual contents of attachment file 420, while a recipient of e-mail message 401, for whom access to attachment 420 is intended, will be able to access attachment 420 since e-mail message 401 is accompanied by the corresponding decryption key. As will be appreciated, other encryption techniques may be utilized as well for these and related purposes, such as public/private key techniques that also allow attachments to be digitally signed for authentication purposes and to verify the attachment's integrity.

As will be understood, in alternative preferred embodiments of the present invention, a plurality of file attachments may be attached to an e-mail message in accordance with the present invention. In this case a corresponding plurality of attachment references may be attached to the e-mail message for independent access by a recipient of any or all of the attachment files. In further alternative preferred embodiments, an attachment reference may be transmitted to a recipient without accompanying an e-mail message, so that, effectively, an e-mail message itself comprises the attachment reference.

E-Mail System Filter for Attachment by Reference or by Value

There is also provided herein a system and method by which an e-mail system can decide whether to attach an attachment to an e-mail message by reference or by value. As will be appreciated, in some situations a use of automatic attachment by reference of each attachment to each e-mail message transmitted may tend to increase the load on the network. In the present e-mail system it is determined whether to distribute a given attachment by reference or by value by establishing a cost figure, as explained in more detail hereinbelow.

Figure 5:
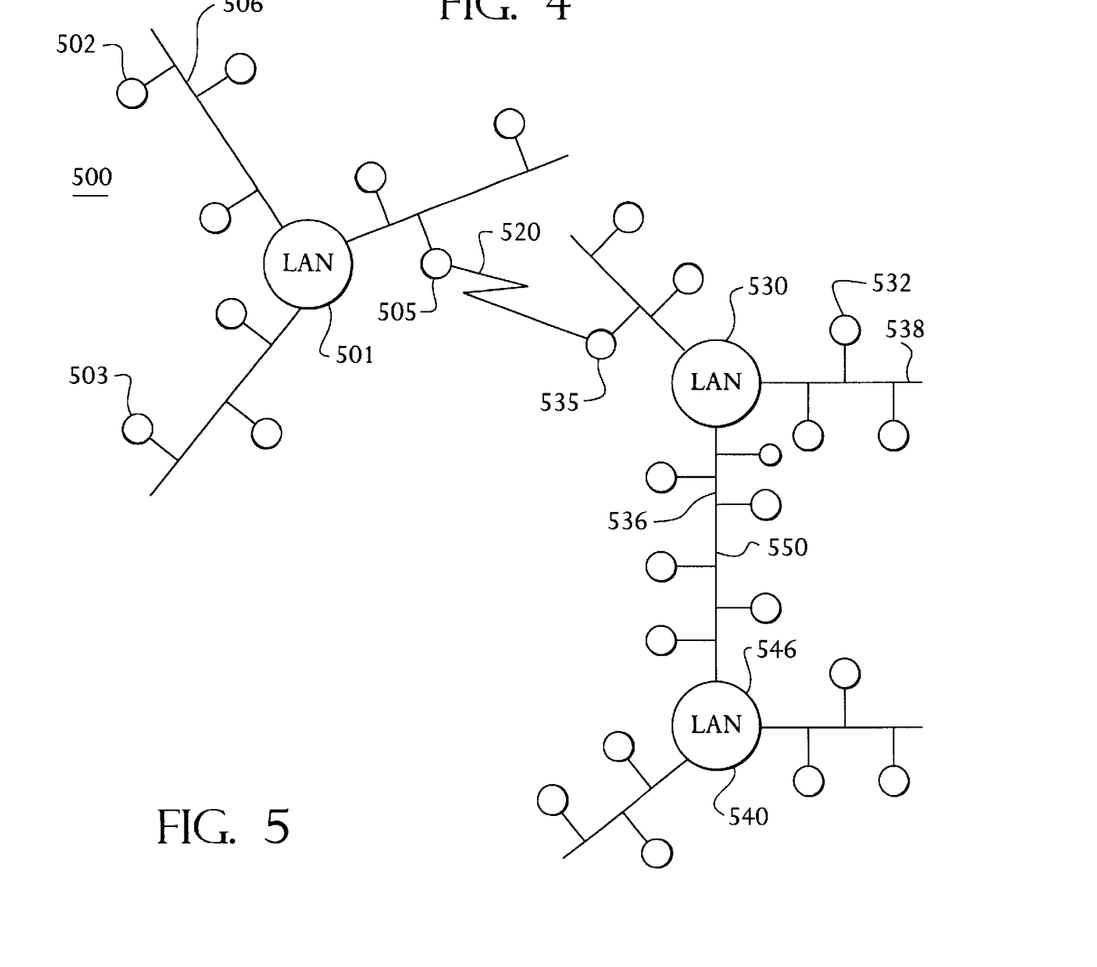
FIG. 5 shows another computer network in accordance with a preferred embodiment of the present invention.

Referring now to FIG. 5, there is illustrated another computer network 500, in accordance with a preferred embodiment of the present invention. As illustrated, network 500 comprises a plurality of LANs such as LANs 501, 530, 540. LAN 501 interconnects a plurality of local users such as sending user 502 and recipient user 503. The lines radiating from each LAN represent subnets such as subnet 506 which connect a subset of the LAN's users to the LAN. Different LANs are typically connected to each other via WAN links such as WAN link 520. Some LANs may also be intercoupled via coupled subnets, as illustrated with respect to the coupling of subnet 536 of LAN 530 with subnet 546 of LAN 540 at junction 550. For purposes of transmitting e-mail messages and attachments to and from users on different LANs, post office servers such as post officer servers 505 and 535 are utilized to interface via the WAN link, as illustrated in FIG. 5. As will be appreciated, on some LANs more than one post office may be utilized to handle a subset of the users of the LAN. Thus, a sender 502 may transmit e-mail to a recipient 503 on the same LAN by utilizing the services of LAN 501 and post office 505, as will be appreciated by those skilled in the art and as further described hereinabove.

However, often a user such as sender 502 wishes to send e-mail to a recipient such as recipient user 532, which is a member of another LAN. When this is to be performed, typically an e-mail message is transmitted from sender 502 through subnet 506 to LAN 501, and therethrough to post office 505. Post office 505 then further transmits the e-mail message via WAN 520 to post office 535, which then delivers the e-mail to recipient 532 via its respective subnet 538. Alternatively, if each post office 505, 535 operates in centralized fashion so that it stores the contents of e-mail messages that are read by local users of the respective LAN, the primary traffic may be between post offices and over WANs, rather than to or from the individual users via their local LANs. As will be appreciated, WAN 520 may comprise a distributed network such as the Internet, or other medium of communication. Thus, several LANs and post offices may need to be traversed before an e-mail message reaches its ultimate destination LAN and user.

In the e-mail system filter of the present invention, post offices of the network system can convert a file attachment by value to a file attachment by reference, and vice-versa. As will be appreciated, attachment by reference is useful for reducing network bandwidth consumption where the available bandwidth in the network is restricted, for example on costly links of the network such as the WAN T-1 links commonly used as part of corporate data network backbones between sites. For instance, WAN link 520 of FIG. 5 may comprise such a WAN T-1 link. However, some LANs or post offices are interconnected via high-speed, relatively low-cost methods such as the intercoupling of subnets, such as described hereinabove with respect to LANs 530, 540. Where network traffic would clog the WAN link or other restricted bandwidth link of the network, limiting the number of copies that cross the link is important. As described hereinabove, utilizing attachment by reference can be useful in addressing this problem.

As will be appreciated, in a system in which attachment by value is utilized, if all relevant users are within a single high-bandwidth network or LAN, then the costs associated with attaching files by value to e-mail messages are dominated by the memory costs of keeping separate copies of attachments for each recipient of the attachment. If the network is bandwidth limited, then such costs are dominated by the costs of network delay. However, the method of attachment by reference can be accompanied by the same problem as attachment by value if too many recipients of an e-mail message are across a costly link in the network. As will be understood, in the limiting case where every recipient decides to look at or otherwise access, retrieve, or utilize an attachment file which is attached by reference, then the method of attachment by reference can degenerate into the worst case of attachment by value, since a separate copy of the attachment must traverse the costly link in the network for each recipient. (However, as will be understood, the frequency of such worst case results may be minimized if caching proxy servers are utilized, where, for example, a server of the network closer in terms of cost to a recipient retains for a certain time a copy of the attachment when it passes the attachment to a recipient of the e-mail message, so that the copy may in some instances be sent to a subsequent recipient that requests the attachment without the attachment needing to be retrieved from its original storage location, which is further in terms of cost than its temporary cached location.) For example, if ten users coupled to LAN 530 were to be listed as a recipient of an e-mail message sent by sender 502, if each such recipient accesses the attachment that is attached by reference, then ten retrievals of the attachment would have to be made across WAN link 520. In this case it may have been cheaper computationally and communications-wise to have transmitted the entire e-mail with attachment by value to post office 535, whereupon post office 535 may more efficiently distribute the e-mail and attachment to all ten local recipients, since only one use of WAN link 520 would have been required to transmit the relatively large e-mail attachment.

This problem may be addressed when using an attachment-by-reference e-mail system by copying the attachment to a location in the network where it is likely that fetching the attachment will cost less. In general, this location is referred to in the present application as a file-replication point, such as a post office. For example, when an attachment reference that accompanies an e-mail message crosses a WAN link such as WAN link 520, the post office at the receiving side of the WAN link (post office 535, for example) automatically creates a copy of the attachment at the receiving post office by retrieving the attachment from its location as pointed to by the attachment reference. The receiving post office also changes all attachment references to point to the newly-created copy that is maintained by the receiving post office. As described above, this may be distributed as necessary to local recipients without engaging high communications medium costs. If further WAN links or post offices remain to be traveled through by the e-mail message before reaching a recipient, each subsequent post office may make further copies of an attachment and change the attachment reference as required to point to the latest storage location of the copy of the attachment file, or may leave the attachment reference untouched as the case ordains.

At a particular file replication point of the network which has received an attachment reference which is on its way through the network from a sender to one or more recipients, the file replication point will, in accordance with the present invention, either leave the attachment reference alone so that it continues to point to the nearest previous location of the attachment, or will replicate a copy of the attachment locally and update the attachment reference accordingly, i.e. so that the attachment reference now points to the local copy of the attachment. In general, the method of the present invention attempts to minimize overall network costs when a particular file replication point makes this determination. This may be done by estimating the costs that will be borne by the network if the reference is unchanged, and by estimating the costs if the attachment is copied locally and the reference updated, and by the file replication point updating the attachment reference accordingly, i.e. by leaving it unchanged if costs would be minimized thereby, or by updating it if this can be expected to lower overall costs.

As will be appreciated, various techniques may be utilized and factors considered in estimating such costs. Ideally, the communication costs of various WAN and LAN segments that would be crossed by attachment retrievals, local storage costs, and related costs are taken into account. The size of the file attachment is also taken into account, as some of these costs vary in accordance therewith. Additionally, an estimate of the group of recipients that are expected to actually retrieve the attachment can further refine the cost estimate, since the accuracy of such cost estimates may be improved if it is known in advance the likelihood of actual attachment retrieval by the recipients, or by certain classes or subsets of recipients or by individual recipients. For instance, if it is known or expected that a particular attachment will very likely be read by most or all recipients, the costs associated with updating the attachment reference at file replication points closer and closer to the ultimate recipients will tend to be lower than the cost of leaving the original attachment reference (and attachment location) unchanged, since very many attachment retrieves over a larger portion of the network would be required when the attachment is read by a large number of the recipients. Conversely, if zero or a small number of recipients are expected to read the attachment, it will tend to cost less to leave the attachment reference unchanged.

Thus, in a preferred embodiment of the present invention the cost of attachment file transport and of attachment file storage is, however, estimated. Generally, the expected cost of recipients retrieving an attachment may be estimated by summing the cost for the attachment to cross each LAN segment and each WAN link or segment on its way to the recipient, and the cost of any storage along the route. Storage costs, as will be understood, include the preservation cost associated with the actual storage medium, such as a hard drive, and processing cost associated with the computations required to move the attachment in and out of the storage medium. Also, storage costs outside the network, such as at a user's machine, will be different from storage costs inside the e-mail system. For example, if the e-mail system is short on the amount of hard disk space, then such costs should increase, to provide a push or "Incentive" to use relatively more of the user's resources for storage purposes. Similarly, if traffic across a particular WAN link becomes heavy, the e-mail system of the present invention will increase the cost of the WAN segment, resulting in more resort to attachment replication and attachment reference substitution so that traffic over the WAN link is reduced.

As will be understood, in the present invention cost estimates in general may be performed, which range in accuracy, sophistication, and number of factors considered. In a preferred embodiment, for instance, a relatively simple type of cost estimate may be utilized. As stated above, normally the size of the attachment is one factor that should be considered. As attachment files are typically fairly large, however, in a preferred embodiment attachment size is presumed to be large and is thus ignored. In a preferred embodiment, transportation costs only, and not storage costs, are taken into account in a preferred cost estimate method of the present invention.

For the following formula, the following definitions are utilized:

Audience: number of intended recipients of an attachment file

Readers: number of intended recipients who actually read the attachment (necessarily less than or equal to Audience)

Segment: a LAN subnet

Transversals: number of Segments required to be crossed to move a message to another Segment Segment Cost: a cost associated with crossing a given Segment The function ∩ is defined as the function that gives the number of common users between two elements. For example, Readers∩Segment gives the number of users on a network segment who read the attachment (where "read" is understood to encompass any form of utilization of an attachment, including viewing, reading, watching, saving, and the like, which would require retrieval of the attachment to allow the recipient to read the attachment). Thus, $$\text{Cost} = \Sigma[\{(\text{Audience}/(\text{Readers}+1))\cap\text{Segment}\}*(\text{Transversals}\cap\text{Segment})*\text{Segment Cost}]$$

The term (Audience/(Readers+1)), as will be understood, is an efficiency factor to account for the actual readership of the attachment. However, at the time the corresponding e-mail message is transmitted, this factor must be estimated by the e-mail system since it will not be known a priori how many users of the audience will actually read the attachment file. As will be appreciated, the estimate may be based, for example, on the particular history of recipient interest in messages sent by a particular user.

The preferred e-mail method of the present invention may be applied to an individual user of a network sending e-mail to other single users, or to groups of recipients. For example, messages between a company president and the immediate corporate staff are very likely to be read completely, including the attachments. In this case, the e-mail system would minimize the message cost by either attaching by reference or by value at particular nodes within the network. In another example, an engineer may send out a weekly status report to dozens of recipients, most of whom are nearby (in terms of network costs) and most of whom will not read the attachment, so that costs are lowered by increased use of attachment by reference. Additionally, as network usage is dynamic, Cost changes with time due to past usage patterns. Thus, temporal filtering of Cost may also be used to improve e-mail system performance, as will be appreciated by those skilled in the art.

The following example is provided to illustrate the filtering method of the present invention. Suppose the following costs, LAN: 1; WAN: 10; and the following distribution of recipients:

| Number of Recipients | LAN Segments | WAN Segments |
| --- | --- | --- |
| 3 | 1 | 0 |
| 4 | 3 | 1 |
| 3 | 6 | 2 |

Thus, in the current example, 3 recipients of the e-mail message require 1 LAN segment and 0 WAN segments to be crossed, and so forth. With these parameters, if every recipient were sent a separate copy of the message (or conversely, the recipients used a fetch-by-URL copy of the attachment that is attached by reference), the total Cost would be $(3*1)+((4*3)+(4*1*10))+((3*6)+(3*2*10))=3+52+78=133$.

This cost may be further reduced by sending a single copy of the attachment over any WAN links and allowing a post office or other file-replication point at the other end of the WAN link to distribute the requisite number of copies further. Thus, using a post office or other file-replication point in this manner, if every recipient reads the attachment, Cost is $(3*1)+((4*3)+10)+((3*6)+(2*10))=3+22+38=63$. As will be understood, this exemplary calculation is based on pessimistic assumptions assuming that the maximum number of WAN and LAN segments are crossed despite file replication points being utilized. Thus, in the previous calculation, one "10" cost is assumed for the second (i.e., "(4*3)") group of recipients, and two "10" costs (i.e., "(2*10)") are assumed for the two WAN segments associated with the third group of recipients, even though redundancy or shared paths between the second and third groups of recipients might reduce this cost estimate in other circumstances, as will be understood.

However, the cost computed here should also be compared to the situation where only some percentage of the audience reads the attachment. In the following example, the parameters are identical to the above example except additional information concerning the number of readers is given (or estimated) as follows:

| Number of Recipients | Number of Readers | LAN Segments | WAN Segments |
| --- | --- | --- | --- |
| 3 | 2 | 1 | 0 |
| 4 | 2 | 3 | 1 |
| 3 | 2 | 6 | 2 |

With this information, if each recipient receives an attachment by reference and a subset of the recipients (the readers) read the attachment (by utilizing fetch-by-URL), Cost is $(2*1)+((2*3)+(2*1*10))+((2*6)+(2*2*10))=2+26+52=80$. However, if a file-replication point is used at the WAN node as described above, the cost is $(2*1)+((2*3)+(1*10))+((2*6)+(2*10))=2+16+32=50$, again with pessimistic assumptions as explained above.

HTTP-Only E-Mail System

As explained above, typically, a user is interfaced to other nodes or users of the WWW through a WWW hyper text transport protocol ("HTTP") server such as servers 310, 320 of FIG. 3. As will be understood, the WWW is a distributed type of application, characterized by the WWW HTTP, the WWW's protocol, which runs on top of the Internet's transmission control protocol/Internet protocol ("TCP/IP"). The WWW may thus be characterized by a set of protocols (i.e., HTTP) running on the Internet as its "backbone." A web browser is an application of a user of a network that, in WWW-compatible type network systems, allows the user to access servers on the network that understand HTTP. For instance, one user may use its web browser to access the "home page" or web site of another user on the WWW. Various hypertext links are typically available to allow access of further files or web sites.

Current e-mail systems are based on a two-level system: (1) a client/server relationship between the user's machine and the user's electronic post office, and (2) a peer system for moving e-mail between post offices, e.g. over a WAN as described hereinabove with reference to FIGS. 2, 3, and 5. In current e-mail systems compatible with WWW-type systems, e-mail and web browser functions are combined as independent applets (i.e., relatively small applications) in so-called compound systems. However, compound systems are often more difficult to maintain and for users to comprehend, in addition to other disadvantages. Thus, there is provided herein an HTTP-only e-mail system which provides for e-mail services utilizing only HTTP, with no necessity of accessing a separate e-mail application in addition to the HTTP web-browser being utilized.

Figure 6:
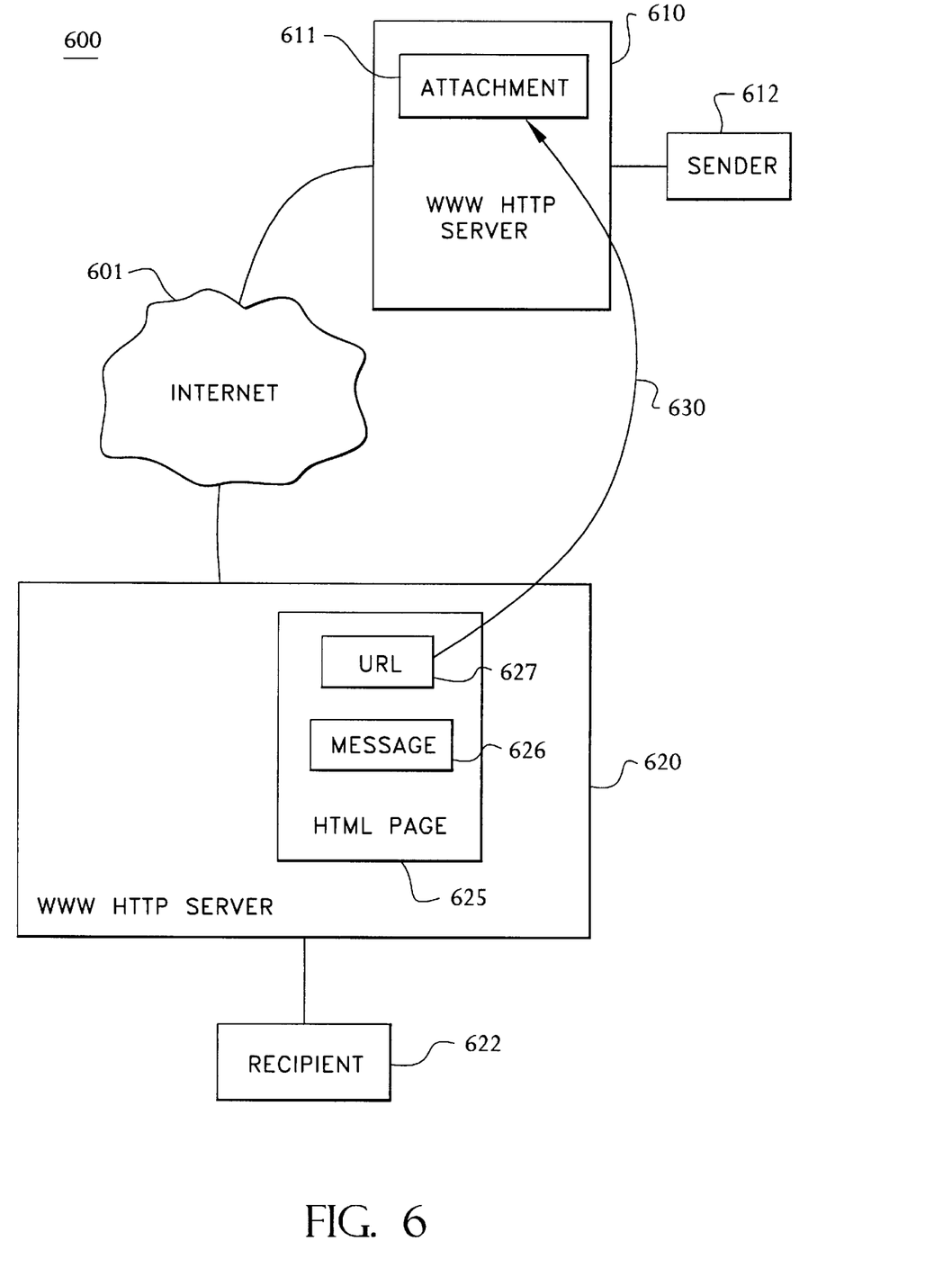
FIG. 6 shows an HTTP-only e-mail system in accordance with a preferred embodiment of the present invention.

Referring now to FIG. 6, there is shown an HTTP-only e-mail system 600 in accordance with a preferred embodiment of the present invention. In a preferred embodiment, a potential recipient user 622 of a network such as the WWW running on the Internet 601 as a backbone, first sets up a reserved hyper-text markup language ("HTML") page 625 on his personal server 620. As will be understood, HTML commands are sent by host machines (such as the recipient's machine 622, in this example) to browsing users' web browsers to instruct the web browser how to display information, such as text, graphics, and available hypertext links. The function of this page 625 is to allow visitors (i.e., other users browsing the recipient's home page, such as sender 612) to modify the page's contents by writing an URL (to refer back to the location of an e-mail message, attachment 611, or other location) and a subject or description line or other message. Sender 612 may use a typical web browser to view recipient 622's "mail page." By accessing an appropriate hypertext link available on the recipient's mail page (such as a hypertext link allowing a browser to "leave an e-mail message"), a process is caused to be executed on the recipient's machine, which is typically a common gateway interface ("CGI") script. As will be appreciated, a CGI script allows a browsing user 612 to tell the recipient's server 620 to do something different than usual, such as returning an HTML form 625. This CGI script returns HTML form 625 to the sender, which asks for the URL 627 and the subject or primary message 626 (if any) of the e-mail. As will be appreciated, the URL 627 that should be incorporated into or attached to the e-mail message 626 may be automatically entered by sender 612's machine in a process invisible to sender 612, or may be entered by the sender 612 himself If accepted, the URL 627 and a corresponding hypertext link (which allows the recipient to read the attachment pointed to with pointer 630 by the URL) are incorporated onto the recipient's mail page, stored at server 620. Therefore, at a later time, the recipient 622 can view the incoming mail page and retrieve messages, including message 626 and attachment 611, if desired, as attachment 611 is stored locally to sender 612 at server 610 but visible to users of Internet 601 such as recipient 622.

As will be understood, the URL 627 which is sent as the message pointer may be either simple or very complex For example, it may be as simple as a particular attachment file which may be retrieved, such as a text file or spreadsheet. Alternatively, the URL may instead be a pointer to an HTML document itself at another location accessible by or visible to users of the WWW. As will be appreciated, an advantage of using such complex URLs is that an "attachment" may be contextually included in the body of an e-mail message, rather than merely attached as an available file for viewing with less context. For instance, the subject or longer e-mail primary message may be left, having a hypertext link based on the URL to a spreadsheet. The words "our financial analysis" could be incorporated as a hypertext link into the subject line or into a longer text e-mail message left on the recipient's mail page. Then, instead of reading the text and then opening the attached spreadsheet (with some concomitant loss of context), as in current e-mail systems, the user could click on the reference itself while reading the message, thus improving the textual reference.

Figure 7:
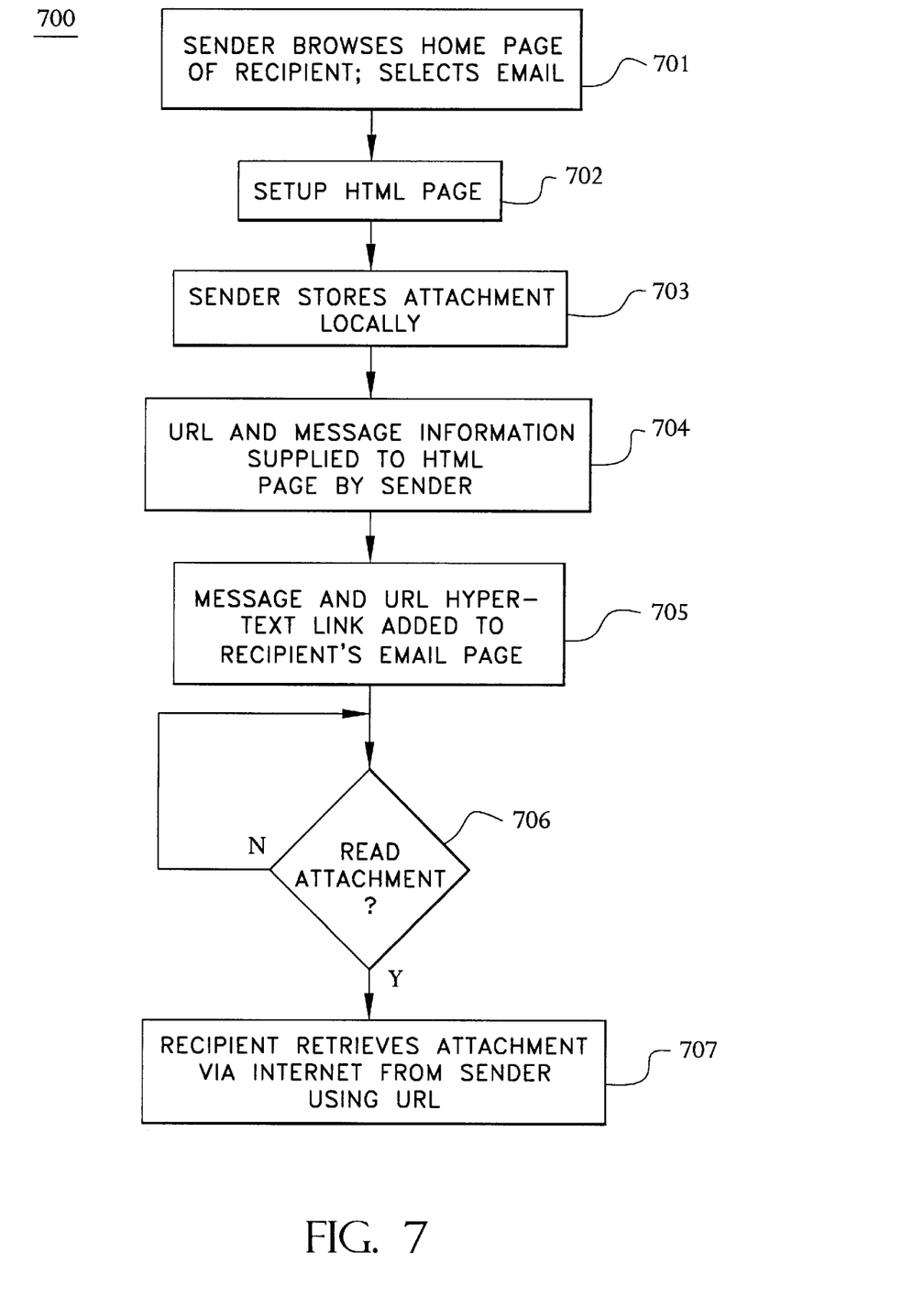
FIG. 7 is a flow chart illustrating the method of operation of the e-mail system of FIG. 6.

Referring now to FIG. 7, there is shown a flow chart 700 illustrating the method of operation of e-mail system 600 of FIG. 6. As illustrated in step 701, sender 612 browses via a web browser on a home page or other web site of recipient 622 that is visible to Internet 601. Upon the sender's selecting a "send e-mail" option (step 701) available on recipient 622's home page, WWW HTTP server 620 provides HTML page 625 (step 702). The sender 612 at this point has already stored an attachment 611 locally (step 703) or at any event must store attachment 610 locally before completing the transmission of the HTTP-only e-mail. As will be understood, the locally-stored attachment 610 must be visible to users of the interconnecting network so that recipient 622, through its WWW HTTP server 620, will be able to retrieve attachment 611 if recipient 622 chooses to read or otherwise access the attachment. Sender 612 then supplies any message 626 and URL pointer 627 in HTML page 625 (step 704). The message and URL hypertext link are added to the recipient's mail page (step 705). When and if recipient 622 decides to read the attachment 611 (step 706), for example by clicking on a hypertext link embedded in message 626, where the hypertext link incorporates URL 627, attachment 611 is retrieved by recipient 622, using its server 620, URL 627, and Internet 601 (step 707).

As will be appreciated, in alternative preferred embodiments e-mail system 600 may employ encryption and/or compression techniques such as discussed above with regard to e-mail message format 400 of FIG. 4 so that fewer network resources are required to transmit (compressed) attachment 611 if and when it is retrieved by the recipient, and, attachment 611 being visible to users of Internet 601, so that the attachment is encrypted to prevent unauthorized users of the WWW to access the attachment.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer or by a distributed network of computers, the computer or network becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for transmitting e-mail over a network, comprising the steps of:
    (a) receiving at a current node in the network an e-mail message to be distributed to at least one recipient, the e-mail message comprising an attachment reference comprising the network address of an attachment stored locally to a previous node of the network;
    (b) comparing the expected costs of moving the attachment from the previous node to the at least one recipient by use of the attachment reference, to the costs of moving the attachment locally to the current node plus the expected costs of moving the attachment from the current node to the at least one recipient by use of the attachment reference; and
    (c) retrieving a copy of the attachment, storing the attachment locally to the current node, and updating the attachment reference, in accordance with the comparison.

2. The method of claim 1, wherein:

the network comprises a plurality of communication segments over which attachments may be transmitted; and the costs of the comparison of step (b) are calculated in accordance with the following cost equation: Cost=$\Sigma$ [{(Audience/(Readers+1))$\cap$Segment}* (Transversals$\cap$Segment)*Segment Cost]; wherein:

Audience is the number of recipients of the at least one recipient;

Readers is the number of recipients that read the attachment;

Segment is a communication segment;

Transversals is the number of Segments required to be crossed to move an attachment to another Segment; and Segment Cost is the cost associated with an attachment crossing a particular Segment.

3. The method of claim 2, wherein a communication segment is either a local-area network (LAN) subnet or a wide-area network (WAN) link.

4. The method of claim 2, wherein the (Audience/(Readers+1) term of the cost equation is estimated based on the history of recipient interest in messages sent by the sender of the attachment.

5. The method of claim 1, wherein the network comprises a plurality of LANs interconnected by WAN links.

6. The method of claim 1, wherein the attachment reference comprises a uniform resource locator.

7. The method of claim 1, wherein:

the network comprises a plurality of LANs interconnected by WAN links;

the current node is a post office server of a LAN of the plurality of LANs and is for interfacing via a WAN link with post office servers of other LANs.

8. The method of claim 1, wherein:

the at least one recipient comprises a plurality of recipients;

the attachment reference is relatively small in size compared to the attachment; and the attachment is a file comprising data.

9. The method of claim 1, wherein:

the network comprises a plurality of LANs interconnected by WAN links; and the costs of the comparison of step (b) include costs of transmitting an attachment across LAN communications segments and WAN links.

10. The method of claim 9, wherein the costs of the comparison of step (b) ignore attachment file size.

11. The method of claim 1, wherein the costs of the comparison of step (b) are calculated based on the history of recipient interest in messages sent by the sender of the attachment.

12. An apparatus for transmitting e-mail over a network, comprising:

(a) means for receiving at a current node in the network an e-mail message to be distributed to at least one recipient, the e-mail message comprising an attachment reference comprising the network address of an attachment stored locally to a previous node of the network;

(b) means for comparing the expected costs of moving the attachment from the previous node to the at least one recipient by use of the attachment reference, to the costs of moving the attachment locally to the current node plus the expected costs of moving the attachment from the current node to the at least one recipient by use of the attachment reference; and (c) means for retrieving a copy of the attachment, for storing the attachment locally to the current node, and for updating the attachment reference, in accordance with the comparison.

13. The apparatus of claim 12, wherein:

the network comprises a plurality of communication segments over which attachments may be transmitted; and the costs of the comparison of means (b) are calculated in accordance with the following cost equation: Cost=$\Sigma$ [{(Audience/(Readers+1))$\cap$Segment}* (Transversals$\cap$Segment)*Segment Cost]; wherein:

Audience is the number of recipients of the at least one recipient;

Readers is the number of recipients that read the attachment;

Segment is a communication segment;

Transversals is the number of Segments required to be crossed to move an attachment to another Segment; and Segment Cost is the cost associated with an attachment crossing a particular Segment.

14. The apparatus of claim 13, wherein a communication segment is either a local-area network (LAN) subnet or a wide-area network (WAN) link.

15. The apparatus of claim 13, wherein the (Audience/(Readers+1) term of the cost equation is estimated based on the history of recipient interest in messages sent by the sender of the attachment.

16. The apparatus of claim 12, wherein the network comprises a plurality of LANs interconnected by WAN links.

17. The apparatus of claim 12, wherein the attachment reference comprises a uniform resource locator.

18. The apparatus of claim 12, wherein:

the network comprises a plurality of LANs interconnected by WAN links;

the current node is a post office server of a LAN of the plurality of LANs and is for interfacing via a WAN link with post office servers of other LANs.

19. The apparatus of claim 12, wherein:

the at least one recipient comprises a plurality of recipients;

the attachment reference is relatively small in size compared to the attachment; and the attachment is a file comprising data.

20. The apparatus of claim 12, wherein:

the network comprises a plurality of LANs interconnected by WAN links; and the costs of the comparison of means (b) include costs of transmitting an attachment across LAN communications segments and WAN links.

21. The apparatus of claim 20, wherein the costs of the comparison of means (b) ignore attachment file size.

22. The apparatus of claim 12, wherein the costs of the comparison of means (b) are calculated based on the history of recipient interest in messages sent by the sender of the attachment.

23. A storage medium having stored thereon a plurality of instructions for transmitting e-mail over a network through a current node of the network, wherein the plurality of instructions, when executed by a processor of the current node, cause the processor to perform the steps of:

(a) receiving at a current node in the network an e-mail message to be distributed to at least one recipient, the e-mail message comprising an attachment reference comprising the network address of an attachment stored locally to a previous node of the network;

(b) comparing the expected costs of moving the attachment from the previous node to the at least one recipient by use of the attachment reference, to the costs of moving the attachment locally to the current node plus the expected costs of moving the attachment from the current node to the at least one recipient by use of the attachment reference; and (c) retrieving a copy of the attachment, storing the attachment locally to the current node, and updating the attachment reference, in accordance with the comparison.

24. The storage medium of claim 23, wherein:

the network comprises a plurality of communication segments over which attachments may be transmitted; and the costs of the comparison of step (b) are calculated in accordance with the following cost equation: $Cost = \Sigma [\{(Audience/(Readers+1)) \cap Segment\} * (Transversals \cap Segment) * Segment\ Cost]$; wherein:

Audience is the number of recipients of the at least one recipient;

Readers is the number of recipients that read the attachment;

Segment is a communication segment;

Transversals is the number of Segments required to be crossed to move an attachment to another Segment; and Segment Cost is the cost associated with an attachment crossing a particular Segment.

25. The storage medium of claim 24, wherein a communication segment is either a local-area network (LAN) subnet or a wide-area network (WAN) link.

26. The storage medium of claim 24, wherein the (Audience/(Readers+1)) term of the cost equation is estimated based on the history of recipient interest in messages sent by the sender of the attachment.

27. The storage medium of claim 23, wherein the network comprises a plurality of LANs interconnected by WAN links.

28. The storage medium of claim 23, wherein the attachment reference comprises a uniform resource locator.

29. The storage medium of claim 23, wherein:

the network comprises a plurality of LANs interconnected by WAN links;

the current node is a post office server of a LAN of the plurality of LANs and is for interfacing via a WAN link with post office servers of other LANs.

30. The storage medium of claim 23, wherein:

the at least one recipient comprises a plurality of recipients;

the attachment reference is relatively small in size compared to the attachment; and the attachment is a file comprising data.

31. The storage medium of claim 23, wherein:

the network comprises a plurality of LANs interconnected by WAN links; and the costs of the comparison of step (b) include costs of transmitting an attachment across LAN communications segments and WAN links.

32. The storage medium of claim 31, wherein the costs of the comparison of step (b) ignore attachment file size.

33. The storage medium of claim 23, wherein the costs of the comparison of step (b) are calculated based on the history of recipient interest in messages sent by the sender of the attachment.

34. A network, comprising:

(a) a previous node;

(b) a current node; and (c) at least one recipient; wherein:

the current node receives an e-mail message to be distributed to the at least one recipient, the e-mail message comprising an attachment reference comprising the network address of an attachment stored locally to the previous node;

the current node compares the expected costs of moving the attachment from the previous node to the at least one recipient by use of the attachment reference, to the costs of moving the attachment locally to the current node plus the expected costs of moving the attachment from the current node to the at least one recipient by use of the attachment reference; and the current node retrieves a copy of the attachment, stores the attachment locally to the current node, and updates the attachment reference, in accordance with the comparison.

35. The network of claim 34, further comprising:

a plurality of communication segments over which attachments may be transmitted; wherein:

the costs of said comparing are calculated in accordance with the following cost equation:

$Cost = \Sigma [\{(Audience/(Readers+1)) \cap Segment\} * (Transversals \cap Segment) * Segment\ Cost]$; wherein:

Audience is the number of recipients of the at least one recipient;

Readers is the number of recipients that read the attachment;

Segment is a communication segment;

Transversals is the number of Segments required to be crossed to move an attachment to another Segment; and Segment Cost is the cost associated with an attachment crossing a particular Segment.

36. The network of claim 35, wherein a communication segment is either a local-area network (LAN) subnet or a wide-area network (WAN) link.

37. The network of claim 35, wherein the (Audience/(Readers+1)) term of the cost equation is estimated based on the history of recipient interest in messages sent by the sender of the attachment.

38. The network of claim 34, wherein the network comprises a plurality of LANs interconnected by WAN links.

39. The network of claim 34, wherein the attachment reference comprises a uniform resource locator.

40. The network of claim 34, wherein:

the network comprises a plurality of LANs interconnected by WAN links;

the current node is a post office server of a LAN of the plurality of LANs and is for interfacing via a WAN link with post office servers of other LANs.

41. The network of claim 34, wherein:

the at least one recipient comprises a plurality of recipients;

the attachment reference is relatively small in size compared to the attachment; and the attachment is a file comprising data.

42. The network of claim 34, wherein:

the network comprises a plurality of LANs interconnected by WAN links; and the costs of said comparing include costs of transmitting an attachment across LAN communications segments and WAN links.

43. The network of claim 42, wherein the costs of said comparing ignore attachment file size.

44. The network of claim 34, wherein the costs of said comparing are calculated based on the history of recipient interest in messages sent by the sender of the attachment.

* * * * *